United States Patent
Kane-Parry et al.

(10) Patent No.: US 10,423,775 B1
(45) Date of Patent: Sep. 24, 2019

(54) ASSISTED PASSWORD GENERATION

(71) Applicant: Amazon Technologies, Inc., Reno, NV (US)

(72) Inventors: David James Kane-Parry, Seattle, WA (US); Phivos Costas Aristides, Seattle, WA (US); Darren Ernest Canavor, Redmond, WA (US); Scott Donald Gregory, Issaquah, WA (US); Matthew Ryan Jezorek, Sumner, WA (US); Jesper Mikael Johansson, Redmond, WA (US); Brian Young Lee, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 136 days.

(21) Appl. No.: 14/297,385

(22) Filed: Jun. 5, 2014

(51) Int. Cl.
*G06F 21/46* (2013.01)

(52) U.S. Cl.
CPC .................... *G06F 21/46* (2013.01)

(58) Field of Classification Search
CPC .......... G06F 17/31; G06F 17/34; G06F 17/41; G06F 17/46; H04L 63/045; H04L 63/067; H04L 63/9869; G06Q 50/01; G06Q 50/04; G06Q 50/12
USPC ........................................................ 726/2, 6
See application file for complete search history.

(56) References Cited

U.S. PATENT DOCUMENTS

| | | | | |
|---|---|---|---|---|
| 5,812,764 | A * | 9/1998 | Heinz, Sr. ................ | G06F 21/31 726/5 |
| 8,613,066 | B1 | 12/2013 | Brezinski et al. | |
| 8,935,762 | B2 * | 1/2015 | Moas ...................... | G06F 21/34 380/44 |
| 2008/0144817 | A1 * | 6/2008 | Brown .................. | H04L 9/3066 380/44 |
| 2009/0293119 | A1 * | 11/2009 | Jonsson .................. | G06F 21/36 726/19 |
| 2012/0042364 | A1 * | 2/2012 | Hebert .................... | G06F 21/46 726/6 |

(Continued)

FOREIGN PATENT DOCUMENTS

| | | | | |
|---|---|---|---|---|
| EP | 1879127 | A1 * | 1/2008 | ............. G06F 21/36 |
| EP | 1879127 | A1 * | 1/2008 | ............. G06F 21/36 |

OTHER PUBLICATIONS

Jules, Ari; Rivest, Ronald L., Honeywords: Making Password-Cracking Detectable, ACM, May 2, 2013, Version 2.0, see pp. 1,3,5.*

(Continued)

*Primary Examiner* — Ashokkumar B Patel
*Assistant Examiner* — William B Jones
(74) *Attorney, Agent, or Firm* — Davis Wright Tremaine LLP

(57) ABSTRACT

Entities of an organization may have difficulties generating and remembering strong passwords. A password management service may generate passwords with high entropy and aid entities in remembering generated passwords. The password management service may generate a list of passwords based on a seed value provided by the entities. The entities may then select a password from the list of passwords to be used at the entities' password. Furthermore, the entities may be allowed to save the list of passwords to aid the entities in remembering their selected password from the list of passwords.

23 Claims, 12 Drawing Sheets

(56) References Cited

U.S. PATENT DOCUMENTS

2015/0293925 A1* 10/2015 Greenzeiger ..... G06F 17/30029
707/734

OTHER PUBLICATIONS

Jules Ari, Honeywords: Making-Password-Cracking Detectable, May 2, 2013, Version 2.0.*
Juels, Ari et al., Honeywords: Making Password-Cracking Detectable, May 2, 2013, RSA Labs, all (Year: 2013).*
Preshing, Jeff, "xkcd Password Generator", Preshing on Programming, pp. 1-3 (Aug. 11, 2011).
Busschots, Bart, "XKPasswd—A Secure Memorable Password Generator", pp. 1-3 (retrieved from the Internet Mar. 21, 2014).

* cited by examiner

US 10,423,775 B1

ASSISTED PASSWORD GENERATION

BACKGROUND

The use of computing services, such as remote data storage services and social networking services, has greatly increased in recent years. The service providers for these computing services may maintain user account integrity by requiring users to authenticate themselves to the service provider using user credentials. For example, a particular service provider may require a user to verify their identity by submitting the correct combination of user name and password. Furthermore, organizations may require entities of the organization to enter a user name and password combination to gain access to organizational resources.

Many current password-based authentication systems rely on the ability of the user to select his or her own password. However, users often do not choose strong passwords, and users often have difficulty remembering randomly-generated passwords. Due to this problem, user-selected passwords are often easily compromised by an attacker. To prevent user information from being easily compromised because of poor user-selected passwords, many authentication systems employ complexity requirements such as a minimum length of eight characters, at least one upper case character, at least one lower character and at least one non-alphabetic character. However, even these complexity requirements may not prevent users from selecting weak passwords. Even when adding additional complexity requirements users may still find a way around the complexity requirements and select weak passwords. For instance, the user may select a keyboard pattern that appears randomly generated, but may be easily attacked and compromised using modern techniques.

BRIEF DESCRIPTION OF THE DRAWINGS

Various embodiments in accordance with the present disclosure will be described with reference to the drawings, in which.

DETAILED DESCRIPTION

Figure 1:
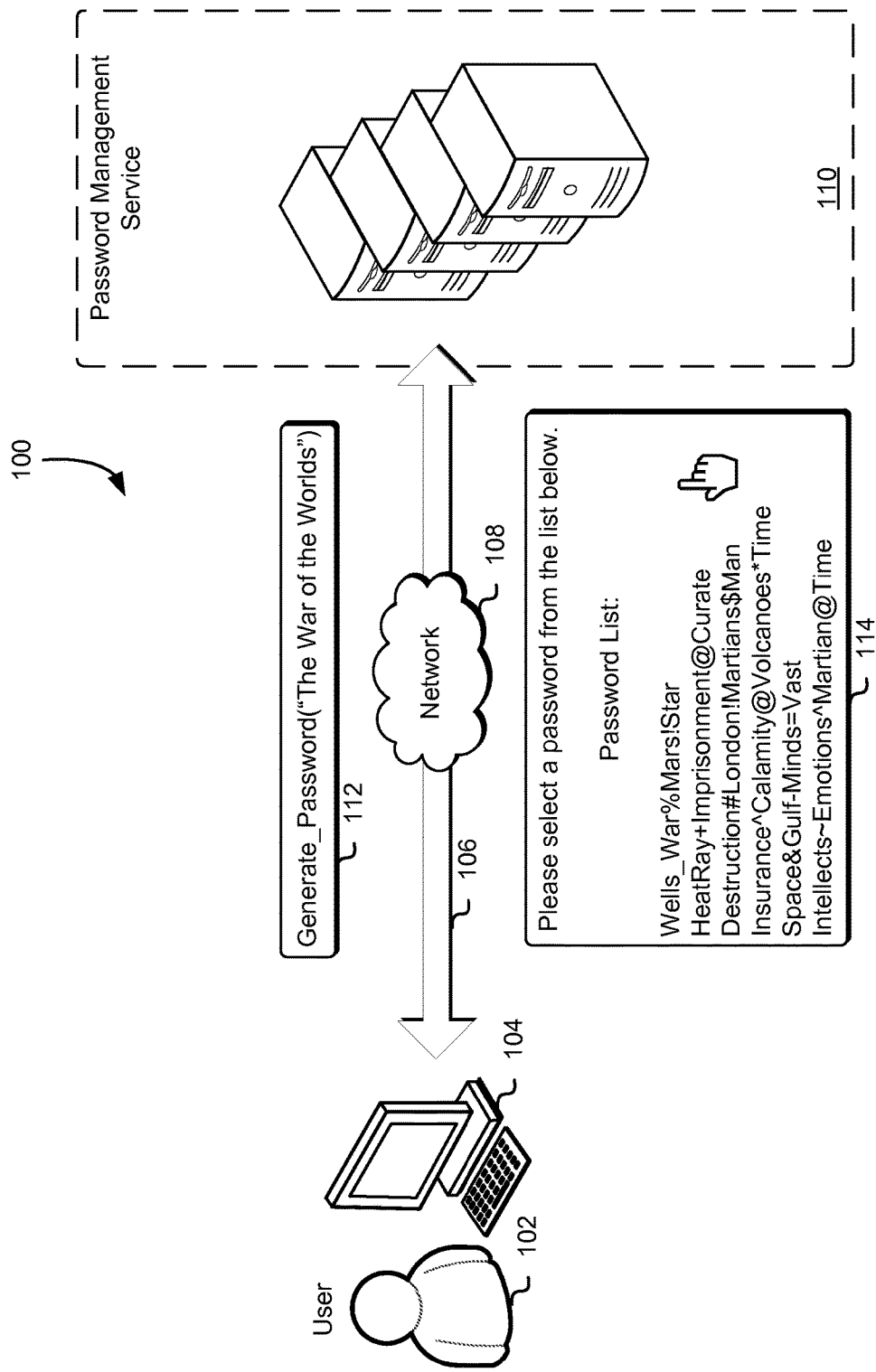
FIG. 1 shows an illustrative example of generating a password list based on a seed value in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements to password generation and password strength for credential based authentication systems and other authentication or security systems including passwords. The password is used to represent information that can be inputted by a user into one or more user input devices for the purpose of authentication. Example passwords include, but are not limited to: passphrases, passcodes, pins, words, strings, names, numbers, characters, ordered collections of symbols, unordered collections of symbols and/or combinations or transformations of these including hashes. The passwords or representations thereof may be saved by the password management service and used for authentication of the users. For example, during an authentication process a client device operated by a user may transmit authentication information to the password management service or other service for authentication. The authentication information may include the password, a hash of the password or other representation of the password suitable for authentication. Furthermore, the techniques described herein may be used with any authentication or security system which requires a password to gain access to restricted information. For example, the techniques described herein may be used by an online retailer or other service provider to improve password strength for customer accounts managed by the online retailer. In another example, organizations or administrators of an organization may use the techniques herein to improve security and mitigate password attacks on entities of the organization, such as employees.

In various embodiments, entropy of a password is improved by requiring users to select a password generated by a password management service, the password management service being responsible for introducing a certain amount of entropy into the passwords available for the users to select. In general, the password entropy may be related to the selection process used to generate the password. However, when users control the selection process, the resulting passwords may be susceptible to various attacks. For example, attackers may gather information corresponding to a particular user and guess the user's password based at least in part on the gather information. In another example, attackers may use password cracking techniques to repeatedly try guesses for passwords. In some embodiments, entropy of the password is increased by randomly selecting components of the password from a collection of password components of a fixed size until the desired entropy is achieved. For instance, the collection of password components could be lower case alphabetic characters. The password management service or other password generator may choose randomly one password component at a time from a set of twenty six lower case alphabetic characters until the entropy requirement is reached. The password management service may randomly choose nine lower case characters achieving roughly forty bits of entropy. Similarly, the password management service may use a collection of words, where the collection of words is large enough, and achieve similar entropy and complexity by choosing at least four words from the collection.

The password management service may generate a list of passwords, where the passwords in the list each contain a selection of password components such that the entropy and complexity of the passwords in the list is above a certain threshold. The user may then be presented with the randomly generated passwords in the password list that meets the entropy requirements indicated by the threshold. The user may then select a password from the list and provide the selection to the password management service, the password management service may then populate various authentication systems with the selected password and/or information derived therefrom, such as a hash of the selected password. For example, the password management system may select four password components chosen from a small collection of English words (e.g. eight to ten thousand words) and generate a list of ten to fifteen passwords generated by selecting four password components. Example passwords may include: "pardonsignindeedhalt," "hurttrekraveniron" or "lidlobbytensereap." The user may then be presented with the list of passwords, if the user does not like the passwords included in the password list the user may request that the password management service generate a new password list from which the user may select a password.

The password management service may also present the user with the option of saving the password list thereby enabling the user to remember or retrieve the selected password at a later time. Saving the password list may include printing the password list using a printer or other service, storing the password list in the memory of a computing device, receiving the password list from a third party and/or any other suitable mechanism for retaining the information contained in the password list. The saved password list may include the user's selected password as well as other passwords generated by the password management service. This may improve the security of the password management system such that in the event that the saved password list is compromised, it is unlikely that an attacker would select the correct password from the password list before appropriate mitigating actions may be taken such as account lockout. Furthermore, the user may be provided with a game to help the user remember the user selected password. For example, after selecting a password the user may be provided with the option of playing a training game to improve password retentions. If the user selects the option of playing the game, the user may be presented with a set of passwords and the user must select their password from the set of passwords.

The password management service or other service may also configure the user account such that the user account automatically locks if any of the other passwords included in the password list are used in an attempt to gain access to one or more resources associated with the password management system and/or user account. For example, during account provisioning the user may select a particular password from the password list generated by the password management service, the selected password may then be set as the user's password and the password list may be saved by the user. If the password list is ever compromised, an attacker may select a password from the password list that is different from the password selected by the user during provision. In some embodiments, the list is sufficiently long such that the probability of selecting an incorrect password is very high (e.g., 0.99). The use of the incorrect password may cause the password management service or other service to lock out the user account upon receipt of the incorrect password and notify the user that the saved password list has been compromised. Furthermore, the password management service may direct the attacker to a dummy user account in order to collect information corresponding to the attacker. For example, the password management service may be part of a security system for an online retailer, when an incorrect password from the password list is used the online retailer may redirect the attacker to an imposter account in order to obtain purchase information and/or location information associated with the attacker. Furthermore, the user may be instructed to destroy the saved password list once the password is memorized or the saved password list may be configured such that it degrades over time or is otherwise rendered unusable after a period.

In some embodiments, the security system or some other system may operate one or more other services to help identify and/or foil attacks from an identified attacker or unidentified attacker and the security system may redirect all communication attempts from the attacker to the one or more other services. In some embodiments, the security system environment may instantiate an imposter service or imposter account that may be configured to receive connection attempts from the attacker and may also be configured to begin remedial action by, for example, seeking out additional information about the attacker. The security system may initially determine the address of the attacker as mentioned herein, but the imposter service may seek to gather information about the person behind the attack such as, for example, by displaying false account settings screen, or by requesting other identifying information in other ways. The imposter system may also seek to determine what kind of computer an attacker is using, what operating system, what web browser, where the attacker is located, the internet service provider (ISP) of the attacker and/or other such pieces of identifying information.

In some embodiments, the imposter service may attempt to engage in a scripted interaction with the attacker, using automation techniques. Such an attack response simulation may be provided to an attacker in a manner that the attacker may be unlikely to detect (a transparent redirection method) in an effort to convince the attacker that the attack is succeeding when it is not, thus keeping that attacker connected in an effort to gather information about the attacker and/or the attack. An imposter service may also provide a plurality of attack response simulations (also referred to simply as "simulations") to an attacker, altering how the imposter responds to the attack as the attack changes. The password management service may be integral to the security system and may be responsible to notify the security system or the imposter service that an attacker may be attempting to access protected resources based at least in part on password information maintained by the password management service.

Furthermore, the password management service may increase the amount of time required to compromise generated passwords using cracking techniques by increasing the complexity and entropy of the generated password. The password management system may also allow for longer periods between password rotations enabling users to keep selected passwords for a longer amount of time. The entropy of generated passwords may be increased to accommodate for improved cracking techniques and/or longer password rotation periods. Furthermore, the password management service may enable administrators and/or users to set different entropy requirements for different services, user accounts or other systems requiring a password. For example, a low privilege account, such as an account of a service agent of an organization, may have a lower entropy requirement than an administrator of an organization where the administrator has root access or super user access to the resources of the organization. Furthermore, user accounts that do not require the user to input the password using an input device (e.g., a keyboard) may have higher entropy requirements relative to user accounts that require the password to be entered using an input device. For example, a user account that required an integrated circuit card (IC card) to access various resources may include a password stored on the IC card that has a password generated by the password management service with a higher entropy value then a password that is not stored on an IC card.

In various embodiments, the password management service uses a seed when generating the passwords to include in the password list presented to the user. The seed may affect the password components available to the password management service or may affect the selection of the password components by the password management service. The password components may be elements used by the password management service to generate one or more passwords. The generated passwords may consist of one or more password components and one or more other components. For example, the set of password components may include eight to ten thousand English words and the password word management service may generate passwords including password components from the set of eight to ten thousand English words. The seed may include music, photographs, video clips, books, media files, sentences, poems, lyrics, names, categories, movies, historical events or other information suitable for aiding in the generation of passwords. Furthermore, the seed may be selected by the user or generated based at least in part on input from the user. For example, the user may be prompted to select a favorite book from a list of books. The selection may be used as a seed for the password management service, the password management service may then generate a list of passwords based at least in part on the selected book. For example, the password management service may select password components from the list of words used in the selected book. Furthermore, the seed could also include a location such as a point in time of a particular song, chapter or page of a particular book, location on a map, area in a photograph and other information suitable for use with the seed. For example, the user may select, as a seed, several song titles and temporal locations corresponding to the selected songs, the password management service may then generate a password based at least in part on the song titles and the song lyrics at the indicated temporal locations corresponding to the selected songs. In addition, information may be collected about the items used as a seed and the collected information may be used to generate the one or more passwords. For example, information about popular passages or chapters of a particular book may be collected, such as user highlights of portions of the electronic version of the particular book. This information may be used to determine the set of password components used to generate the one or more passwords when the particular book is selected as a seed by the user.

In addition, the password management service may provide mechanisms to help users remember and memorize passwords provided by the password management service. For example, the password management service may establish strong mnemonic-based passwords by prompting users to provide an already-memorized phrase to be used to generate passwords, such as in a seed used to generate the password lists as described above. The already-memorized phrase may include a favorite movie quote, the punchline to a joke, or any other phrase a particular user has memorized. Once the phrase is submitted, the password management service may convert the phrase into a mnemonic by retaining only the first character of each word in the phrase and ignoring special characters.

The password management service may then randomly or pseudo-randomly inject upper and lower casing of letters, one or more numeric characters and one or more special characters into the mnemonic, until the password has a minimum number of bits of entropy. This process may be repeated until the desired number of passwords for the password list has been generated. The mnemonic-based password or mnemonic-based password list may then be presented to the user for acceptance. If the user determines that the password(s) presented may be too difficult to remember, they may reject the password, and restart the process to submit the same or a different phrase. The user may also be provided with the option of saving the password list if the user determines that the password list presented may be too difficult to remember. For example, if the user selects the option indicating that the password will be too difficult to remember, the password management service may then provide the user with the option of saving the password list in order to aid the user in remembering the user's selected password. The password management service may prompt the user for a longer phrase or a minimum number of words to be included in the phrase. Furthermore, the longer the phrase presented to the password management service the less random characters the password management service may inject into the passwords generated based at least in part on the user-provided phrase.

FIG. 1 illustrates an example environment 100 where one or more computer systems running within a service provider environment, as well as the associated code running thereon, may execute a password management service. A service provider may include website operators, online retailers, social network providers, cable providers, online game providers, organization or any entity providing a user the ability to access information based at least in part on a password. A user 102 (also referred to as a customer) may connect 106 to a password management service 110 through a computer system client device 104 and may initiate connection with and/or interaction with one or more applications running on a computer system operated by the service provider. For example, the user 102 may connect to a computer system of an online retailer in order to access the password management service 110 and update or create a password associated with the user's account managed by the online retailer. The password management service 110 may provide a mechanism for generating, selecting, saving and authenticating passwords and other credentials provided by users 102. The password management service 110 may be a collection of computing resources collectively configured to receive one or more interactions from users 102 and provide security and authentication for the users 102. For example, the password management service may be an authentication service provided by an organization to entities of the organization. Furthermore, the password management service may include an interface (not shown in FIG. 1 for simplicity), the interface may enable the password management service 110 to receive application programming interface (API) request or other requests and process the requests.

The command or commands to connect to the password management service 110 may originate from an outside computer system and/or server, or may originate from an entity, user or process on a remote network location, or may originate from an entity, user or process within the computing resource service provider, or may originate from a user 102 of the computer system client device 104, or may originate as a result of an automatic process or may originate as a result of a combination of these and/or other such origin entities. In some embodiments, the command or commands to initiate the connection 106 to the password management service 110 may be sent, without the intervention of the user 102. For example, an automated service may attempt to connect 106 to the password management service 110 through computer system client device 104 in order to perform various password management activities, such as authentication credentials or generating new passwords.

The user 102 may request connection to the password management service 110 via one or more connections 106 and, in some embodiments, via one or more networks and/or entities associated therewith, such as servers connected to the network, either directly or indirectly. The computer system client device 104 that may request access to the password management service 110 may include any device that is capable of connecting with a computer system via a network 108, including at least servers, laptops, mobile devices such as smartphones or tablets, other smart devices such as smart watches, smart televisions, set-top boxes, video game consoles and other such network-enabled smart devices, distributed computing systems and components thereof, abstracted components such as guest computer systems or virtual machines and/or other types of computing devices and/or components. The network 108 may include, for example, a local network, an internal network, a public network such as the Internet, a wide-area network, a wireless network, a mobile network, a satellite network, a distributed computing system with a plurality of network nodes and/or the like. The network 108 may also operate in accordance with various protocols, such as those listed below, Bluetooth, Wi-Fi, cellular network protocols, satellite network protocols and/or others.

The users 102 may interact with the online retailer using a web browser or other application executed by the computer system client device 104. To enable the users 102 to interact with the password management service 110 or interface of the password management service 110, the computer system client device 104 may transmit one or more Hypertext Transfer Protocol (HTTP) requests over the network 108 to one or more web servers operated by the organization providing the password management service 110. The one or more web servers may then redirect, forward, or otherwise cause to be transmitted the one or more HTTP requests to the password management service 110. The requests may also be received by the request routing service and directed to the password management service 110. The request may include a request to generate a password 112. In various embodiments, the request to generate a password does not include additional information such as a seed. The request 112 may be generated by the computer system client device 104 based at least in part on input received from the user 102. For example, the computer system client device 104 may generate the request 112 based at least in part on a seed provided by the user. As illustrated in FIG. 1, the user may provide a book title "The War of the Worlds" to be used as a seed in generating the password and/or password list.

The password management service 110 may receive the request and the seed and determine one or more passwords based at least in part on the request 112. Returning to the example above, the password management service 110 may obtain, based at least in part on the seed, the text of "The War of the Worlds" to use as a set password components during password generation. The password management service 110 may request the text or a portion of the text from one or more other services, such as a media service to be described in greater detail below in connection with FIG. 8. The password management service 110 may then generate a list of passwords 114 to present to the user 102. The list of passwords 114 may include a password generated using any of the techniques described in the present disclosure. For example, the passwords may be generated based on a set of password components including words in a particular language, such as a set of German words. In another example, the passwords may be generated based on a set of password components selected based at least in part on user 102 information, such as a set of categories the user 102 has indicated as favorite categories.

The passwords in the list of passwords 114 may be generated by at least selecting a certain number of password components from the set of password components. In various embodiments, the password management service 110 injects random or pseudo-random characters at various locations in the passwords in order to increase entropy of the passwords included in the list of passwords 114. Entropy may be a measure of unpredictability of information contained in the passwords. Entropy may quantify the expected value of the information contained in the generated passwords and may be measured in bits. Entropy may further be considered the average unpredictability in a random variable, which is equivalent to its information content, such as the information contained in the password. As illustrated in FIG. 1, the seed may be used to generate the passwords included in the list of passwords 114 by at least determining the set of password components used to generate the password. In this case, the password "Wells_War % Mars!Star" included in the list of passwords 114 is generated from the set of words in the index of the book "The War of the Worlds" included as a seed value in the request 112. Other sets of words from the book "The War of the Worlds" may be used to generate the password. For example, the password management service 110 may determine one or more popular quotes from the book and obtain the set of words based at least in part on the one or more popular quotes from the book.

The list of passwords 114 may be provided to the user 102 through the client computing device 104 using a variety of techniques such as those described above, such as a webpage. The user 102 may then, using an input device connected to client computing device 104, select a password from the list of passwords 114. Selecting a password from the list of passwords 114 may cause information corresponding to the selected password to be transmitted to the password management service 110. For example, once the user selects a password from the list of passwords 114 the client computing system may transmit an indication to the password management service 110 indicating the password selected by the user 102. If the user does not select a password from the list of passwords 114 the password management service 110 may generate a new list of passwords based on the previous request 112 or a new request. Once a user 102 has selected a password from the list of passwords 114, the user may be presented with the option of saving the list of password to be discussed in greater detail below in connection with FIG. 2. In various embodiments, the user may generate the list of passwords 114 and the password management service 110 may select a password for the user from the list of passwords. Furthermore, the password management service 110 may generate the list of passwords 114 and select a particular password to be the user's password from the list of passwords 114. The password management service 110 may then indicated which password from the list of passwords 114 is the user's password and allow the user to save or print out the list of passwords 114. The password management service 110 may also wait until a password has been selected before generating the list of passwords and/or allowing the user to save the list of passwords 114.

Figure 2:
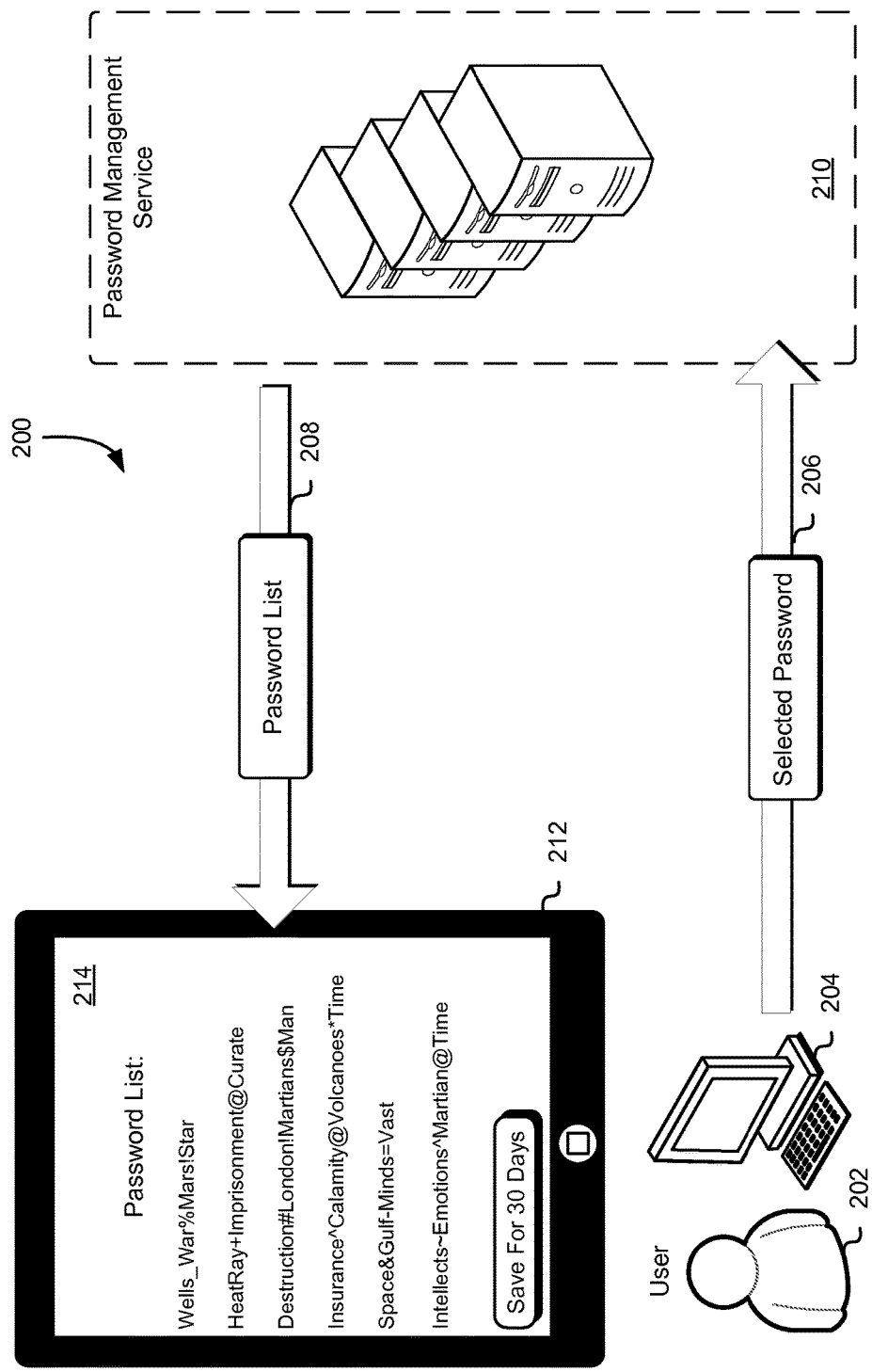
FIG. 2 shows an illustrative example of providing a password list to a user in accordance with various embodiments.

FIG. 2 illustrates an example environment 200 where one or more computer systems running within a service provider environment, as well as the associated code running thereon, may execute a password management service. A user 202 may connect 206 to a password management service 210 through a computer system client device 204 and may initiate connection with and/or interaction with one or more applications running on a computer system operated by the service provider. For example, the user 202 may request a password or list of passwords from the password management service as described above in connection with FIG. 1. Returning to FIG. 2, the user may select a password provided by the password management service 210, the password may be provided in a list of passwords. After the user 202 has selected a password, the password management service may enable the user 202 to save the list of passwords 214. The user 202 may also be presented with the list of passwords 214 such that the user 202 may save the list of passwords 214 before selecting a password from the list of passwords. The password management service 210 or other service may place constraints on the duration a user has to select a password from the list of passwords 214. For example, the user 202 may be presented the list of passwords 214 including the ability to obtain the list of passwords, however the user 202 may only be able to select a particular password from the list of passwords 214 during a single session. The list of passwords 214 available to the user 202 for saving may be the same list of passwords provided to the user 202 to select a password from or may be a different list of passwords. For example, the user may select a password from a particular list of passwords, the password management service 210 may include the selected password in the password list 214 available to the user for saving.

The list of passwords 214 may be transmitted to a computing device 212 selected by the user 202 over a connection 208. For example, the user 202 may register a device with the password management service 210, the registered device may be configured to receive and store password lists provided by the password management service 210. The user 202 may also be provided with the option to print the password list using the client computing device 204 or other device. As shown in FIG. 2, the computing device 212 may be configured to save the list of passwords 214 for a period of time or other duration such as a total number of views. The password management service 210 may configure the list of passwords 214 in a particular format for one or more devices or applications. For example, the password management service 214 may include the list of passwords 214 in the HyperText Markup Language (HTML) code associated with a webpage, the webpage may be further configured such that the user may view the webpage on computing device 212 or other device such as the computer system client device 204. The computing device 212 may be configured to store the password list in a protect manner, such as in an encrypted format. The computing device 212 or application thereof may then decrypt the list of passwords 214 when the user 202 requests to view the list of passwords 212.

In various other embodiments the list of passwords is not a list, but some other structure suitable for displaying passwords to a user and receiving a selection of a password of the displayed passwords, such as a matrix, or an unordered representation of passwords. When the passwords are displayed as a matrix of passwords, the user may provide row and column numbers to select the password from the displayed matrix of passwords. When the passwords are displayed as an unordered representation of passwords, the user may simply enter the select password using an input device such as a keyboard or microphone. Furthermore, there may be multiple pages in each representation of the passwords and there may be multiple passwords on each page. The page number may be one of several numbers the user provides to identify which password is selected.

Figure 3:
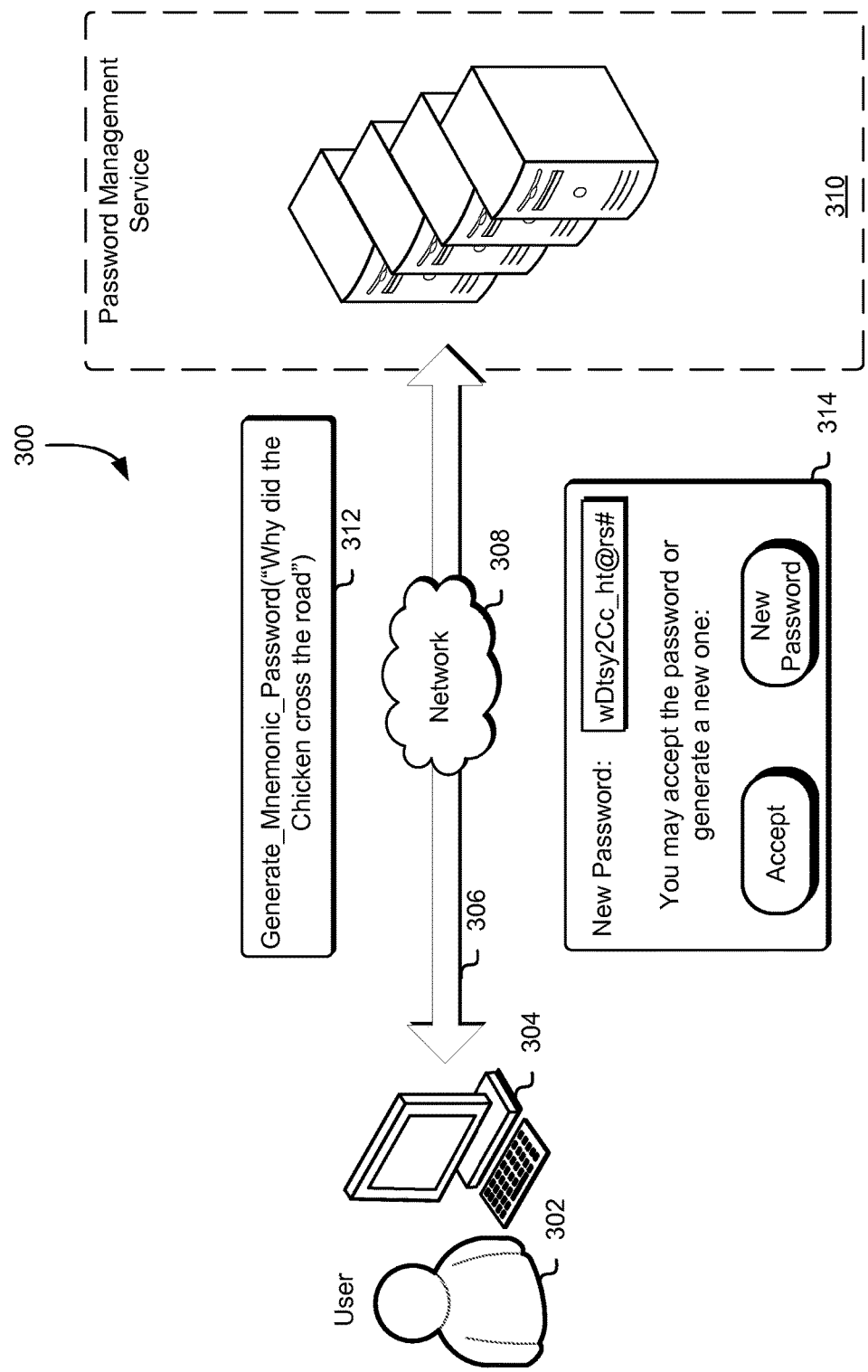
FIG. 3 shows an illustrative example of providing a mnemonic password to a user in accordance with various embodiments.

FIG. 3 illustrates an example environment 300 where one or more computer systems running within a service provider environment, as well as the associated code running thereon, may execute a password management service. A user 302 may connect 306 to a password management service 310 through a computer system client device 304 and may initiate connection with and/or interaction with one or more applications running on a computer system operated by the service provider. For example, the user 302 may connect to a computer system of an organization in order to access the password management service 310 and create a password for use within the organization.

The user 302 may request connection to the password management service 310 via one or more connections 306 and, in some embodiments, via one or more networks and/or entities associated therewith, such as servers connected to the network, either directly or indirectly. To enable the users 302 to interact with the password management service 310, the computer system client device 304 may transmit one or more requests 312 over the network 308 to one or more computer systems operated by the organization providing the password management service 310. The one or more computer systems may be responsible for executing the password management service 310. The request 312 may be generated by the computer system client device 304 based at least in part on input received from the user 302. For example, the computer system client device 304 may generate the request 312 based at least in part on a phrase or set of words provided by the user 302.

As illustrated in FIG. 3, the set of words may be a joke or part of a joke known to the user 302. The user 302 may provide the phrase to be included in the request 312 using one or more input devices connected to the computer system client device 304. For example, the computer system client device 304 may provide an interface configured to receive input from the user 302 through a keyboard communicatively coupled to the computer system client device 304, the interface may be further configured to generate the request 312 based at least in part on the input received from the user 310 and transmit the request over the network 308 to the password management service 310. The password management service 310 may then generate a password or list of passwords based at least in part on the request 312. For example, the password management service 310 may obtain the first letter from each word in the user provided phrase included in the request 312. In the example illustrated in FIG. 3, the list of characters would include "WDTCCTR," correspond to the phrase "why did the chick cross the road." The password management service 310 may then determine if the password contains sufficient entropy for use with one or more security systems and insert one or more characters at one or more locations in order to increase the entropy.

In various embodiments, the user 302 may be presented with a set of phrases from which to select, the selected phrase may be included in the request 312 and used by the password management service 310 to generate one or more passwords for the user 302. The user 302 may be presented with a user interface 314, the user interface 314 may include the one or more passwords generated by the password management system, the option to accept a particular password and the option to receive one or more new passwords. If the password is rejected by the user 302 the password management service 310 may generate a new password based on the provided phrase or a new phrase provided by the user 302. However if the user 302 accepts the password, the password management service 310 may then set the accepted password as the user 302 password and/or propagate the accepted password to one or more other services or computer systems. For example, the user-selected password may be transmitted to an electronic banking account associated with the user 302. In this example, the user 302 may have requested a password from the password management service 310 for use with the user's electronic banking account or the organization providing the electronic banking account to the user 302 may require the user to establish a password using the password management service 310.

Figure 4:
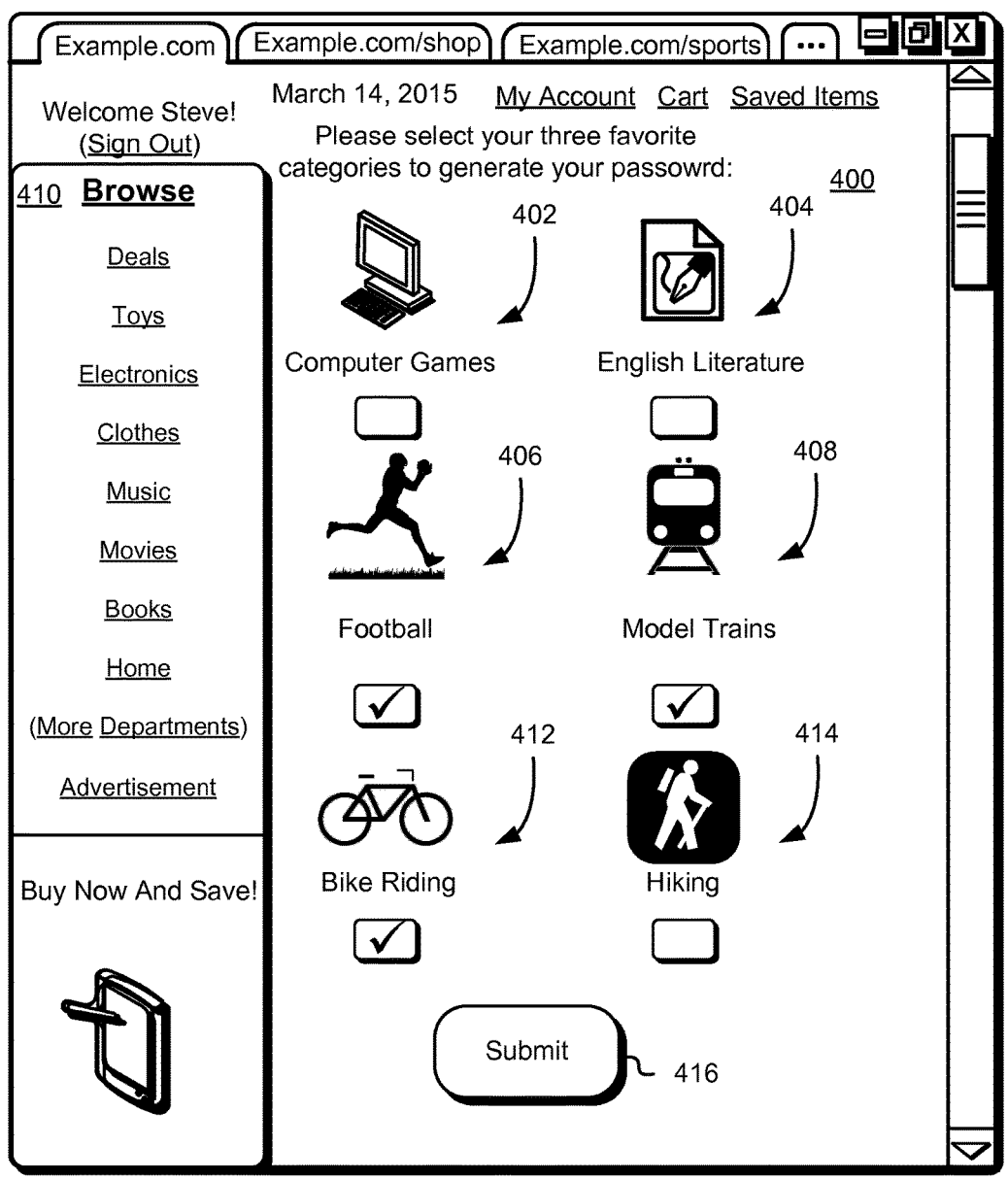
FIG. 4 shows a diagram illustrating a webpage for selecting information useable as a seed for password generation in accordance with various aspects of the present disclosure.

FIG. 4 shows a webpage 400 which may be displayed by an application executed by a computing device enabling a user to interact with a password management service operated by an online retailer. As illustrated in FIG. 4, the webpage 400 includes various graphical user interface elements that enable navigation throughout the electronic commerce website of which the webpage 400 is a part. The webpage 400 may be displayed by various applications, such as a mobile application or web browser. In this example, the webpage 400 includes various navigational features. For instance, on the left-hand side of the webpage 400, various links 410 may link to one or more other webpages that contain additional content corresponding to department pages and/or category pages. The department and/or category pages may correspond to department and category information used by the product information service. In this example, the links appear as textual words which enable the links to be selected using an appropriate input device such as a keyboard, mouse, touchscreen or other input device. Selection of one of the links 410 may cause an application displaying the webpage 400 to submit, pursuant to a URL associated with the selected link by the programming of the webpage 400, an HTTP request for the content associated with the link to a server that provided the webpage 400 or another server. In this example, the webpage 400 also includes a graphical user element configured as a "submit" button 416. The submit button 416 may be a graphical user interface element of the webpage 400 where the underlying code of the webpage 400 is configured such that selection by an input device of the submit button 416 causes information corresponding to the selection of categories by the user to be transmitted to the password management service.

The webpage 400 may also include a graphical user element configured as radio buttons or check boxes corresponding to categories or other information useable in generating a password. The radio button may be a graphical user interface element of the webpage 400 where the underlying code of the webpage 400 is configured such that selection by an input device of one or more of the radio buttons causes information corresponding to the categories displayed on the webpage 400 to be recorded or otherwise stored for use by the password management service. In this example, the webpage 400 contains six categories for selection by the user, computer games 402, English literature 404, football, 406, model trains 408, bike riding 412 and hiking 414. The categories may be selected based at least in part on information associated with the user's account. For example, the categories may be selected based at least in part on the categories associated with items purchased by the user from the online retailer. Further, the categories displayed webpage 400 may be replaced with other information the user may select and which may be used by the password management service to generate one or more passwords including book titles, book covers, album covers, song titles or any other information associated with the user.

Furthermore, the categories displayed in the webpage 400 may be services offered by the online retailer or one or more other organizations, for example, the services may include an installation service, delivery service or other service. The categories displayed on the webpage 400 may contain a presentation of the items such as a graphical representation of the items, which could be text and/or a drawing, photograph, description, identification number, trademark, video clip, audio clip or any other representation capable of representing the items. The user may select the categories using radio buttons or by selecting the image associated with the category. Other variations of the user interface displayed in FIG. 4 may be used in accordance with the present disclosure. For example, drop-down menus may be included in the user interface to enable the user to select classifications or categories of items for use in generating one or more passwords for the user. The user may be offered a promotional price on a particular item, an account credit or a discount for selecting a password generated by the password management service.

The categories of items selected to include in user interface may be selected based at least in part on a variety of different techniques. At least a portion of the items may be selected based at least in part on the number of times items for a particular category have been viewed either by the user or other users. For example, items viewed more often may be better known among users of the online retailer and information about the items, such as descriptions or definitions, may also be well known. Items viewed less often may be less well known among customers of the online retailer than more frequently viewed items. The password management service or other service may select categories of items based at least in part on the number of times a particular item in a particular category has been viewed. Items may also be selected based on how many times the items have been viewed in a particular geographic area.

The online retailer may determine a particular geographic area based at least in part on an IP address associated with a request to view an item. The online retailer may also determine an item's relative popularity based at least in part on aggregated purchase histories of customers in geographic areas associated with an IP address. Items purchased more often in a geographic area may be considered more popular relative to items purchased less often in the geographic area.

The password management service may then select a category based at least in part on an IP address of the user and information corresponding to the relative popularity of various categories in the geographic area associated with the IP address. For example, outdoor items may be more popular in California and Florida and the password management service may select outdoor categories, such as hiking 414, to include in the seed selection process in response to a request to generate one or more passwords transmitted from California.

The webpage 400 may be caused to be displayed for a variety of reasons described in greater detail below in connection with FIG. 8. For example, the webpage 400 may be displayed because a user has selected an option to create a new password, an administrator of an organization has determined one or more user passwords may have been compromised, a user is attempting to create a new user account associated with an organization or any other reason to set a user's password. The webpage 400 may also be displayed for a variety of other reasons. For example, an organization may determine to redirect users to the password management service at random, after processing a number of password requests, at a particular time of day or year or any other reason suitable for mitigating attacks on user passwords. Selection of the categories displayed on the webpage 400 may cause the password management service to receive the selection by the user and information associated with the selected categories. For example, a product information service, to be described in greater detail below in connection with FIG. 8, may obtain information corresponding to one or more products associated with the categories selected by the user and transmit the information to the password management service for use in generating one or more passwords for the user.

Once the password management service has received the user's selection and/or generated one or more passwords based at least in part on the user's selection, a notification may be sent to the user. The notification may include e-mail, short message service, notification in the customer's account associated with the online retailer, telephone call, video call, chat message or any other notification suitable for alerting the customer of the price reduction. Furthermore, the notification may be included in one or more messaging services the customer has elected to receive. The password management service may use words or other information associated with the user selected categories as password components for generating the one or more passwords. For example, the password management service may obtain a set of words associated with each category and combine the sets into a single set, select a certain number of words from each set to combine into a single set or may maintain the set of words separately. Furthermore, the password management service may select a certain number of words from each category to include in the password. In the example illustrated in FIG. 4, the password management service may generate the one or more passwords including one password component from each category, such as "chaintouchdownlocamotive" or "wheelrouterail." As described above, additional characters, words or password components may be added to increase entropy.

The user interface displayed in webpage 400 may be pre-generated and stored in one or more storage systems of the organization or may be generated upon receipt of the password generation request. The user interface may also be partially pre-generated and completed upon receipt of the password generation request. For example, the password management service may generate a framework for the user selection process including placeholders for images of items and associated categories. Upon receipt of the password generation request the password management service may determine, based at least in part on the information associated with the user, one or more categories to include in the user interface. The password management service may obtain information associated with the users and/or categories to include in the user interface from one or more other services or computer systems of the organization.

Once the user has selected one or more categories presented in webpage 400 and selected the submit 416 button the user may be presented with one or more passwords generated based at least in part on the categories selected by the user. The submit 416 button may redirect the user to one or more other webpages including the generated passwords or may cause the generated passwords to be transmitted to the user through another mechanism, such as a notification. The user may be provided with the option of selecting a password from the one or more generated passwords for use as the user's password. The password management service may obtain the user's selection of a particular password or passwords and distribute the selected password or passwords to one or more security systems. The security systems may be designated by the user or may be registered with the password management service.

Figure 5:
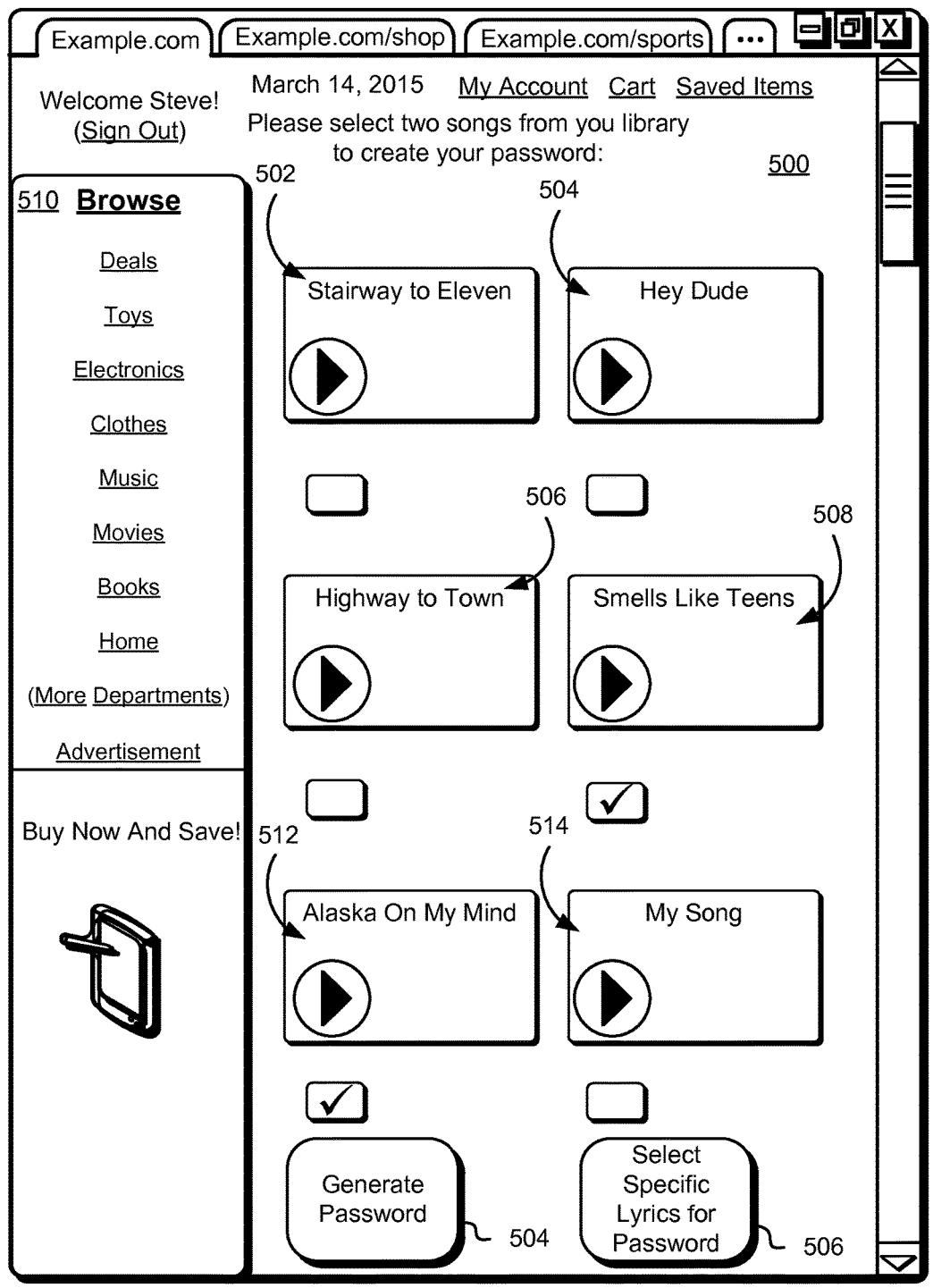
FIG. 5 shows a diagram illustrating a webpage for selecting information useable as a seed for password generation in accordance with various aspects of the present disclosure.

FIG. 5 shows a webpage 500 which may be displayed by an application executed by a computing device enabling a user to interact with a password management service operated by an online retailer or other organization. As illustrated in FIG. 5, the webpage 500 includes various graphical user interface elements that enable navigation throughout the electronic commerce website of which the webpage 500 is a part. The webpage 500 may be displayed by various applications, such as a mobile application or web browser. In this example, the webpage 500 includes various navigational features. For instance, on the left-hand side of the webpage 500, various links 510 may link to one or more other webpages that contain additional content corresponding to department pages and/or category pages. The department and/or category pages may correspond to department and category information used by the product information service. In this example, the links appear as textual words which enable the links to be selected using an appropriate input device such as a keyboard, mouse, touchscreen or other input device. Selection of one of the links 510 may cause an application displaying the webpage 500 to submit, pursuant to a URL associated with the selected link by the programming of the webpage 500, an HTTP request for the content associated with the link to a server that provided the webpage 500 or another server.

In this example, the webpage 500 also includes a graphical user element configured as a "generate password" button 504. The generate password button 504 may be a graphical user interface element of the webpage 500 where the underlying code of the webpage 500 is configured such that selection by an input device of the generate password button 504 causes information corresponding to the selection of songs by the user to be transmitted to the password management service. The webpage 500 also includes a graphical user element configured as a "select specific lyrics for password" button 506. The select specific lyrics for password button may be a graphical user interface element of webpage 500 where the underlying code of webpage 500 is configured such that the selection by an input device of the select specific lyrics for password 506 cause the user to be redirected to one or more other webpages that contain additional information corresponding to the songs selected by the user as seeds for password generation. For example, the page may contain a graphical representation of the songs including lyrics or sets of lyrics that are selected by a user using an input device. Other attributes of media that may be used as a seed include book title, author information, quotes, clips, or any other attributes of a particular piece of media.

The webpage 500 may also include a graphical user element configured as radio buttons or check boxes corresponding to songs useable in generating a password. The radio buttons may be a graphical user interface element of the webpage 500 where the underlying code of the webpage 500 is configured such that selection by an input device of one or more of the radio buttons causes information corresponding to the songs displayed on the webpage 500 to be recorded or otherwise stored for use by the password management service. In this example, the webpage 500 contains six songs "Stairway to Eleven" 502, "Hey Dude" 504, "Highway to Town" 506, "Smells Like Teens" 508, "Alaska On My Mind" 512 and "My Song" 514. The songs may be included in webpage 500 based at least in part on information associated with the user and/or the popularity of the songs among other users of the organization. For example, the songs may be included in a library associated with the user or may be the most frequently played songs by the user. The user may also have the option to receive a new set of songs to use as a seed for password generation.

The password management service may receive the user selection of songs and lyrics and generate one or more passwords based at least in part on the user selection. The song titles, lyrics, composer, band, producer, production company and other information associated with the song may be used as password components from which the password is generated. In the example illustrated in FIG. 5, the set of password components may include information relating to the user selected songs "Alaska On My Mind" 512 and "Smells Like Teens" 508. The one or more passwords generated by the password management service may include elements of the set of password components such as "alaskateens" or "smellsmymind." The generated one or more passwords may be presented to the user using a variety of techniques including those not specifically described herein. The user may then be provided with the option of selecting at least one of the one or more passwords presented to the user for use as the user's password.

In various embodiments, the webpage 500 includes a graphical user element configured as a hint button. The hint button may cause the password management service to provide the user with a hint or other information which may enable the user to remember the user's password. The provided hint may be context sensitive such that the hint may enable the user to remember the user's password but may not enable an imposter to obtain the user's password. For example, after some period of time without the user providing the user's username and password, the user may have forgotten their password. The user may then select the hint button and receive an e-mail, to an address registered with the user's account, including information used to generate the password, such as the song title and lyrics selected by the user to create the password. The hint button may be displayed in a graphical user interface enabling at least some interaction with the password management service as illustrated in numerous embodiments described in accordance with the present disclosures.

Figure 6:
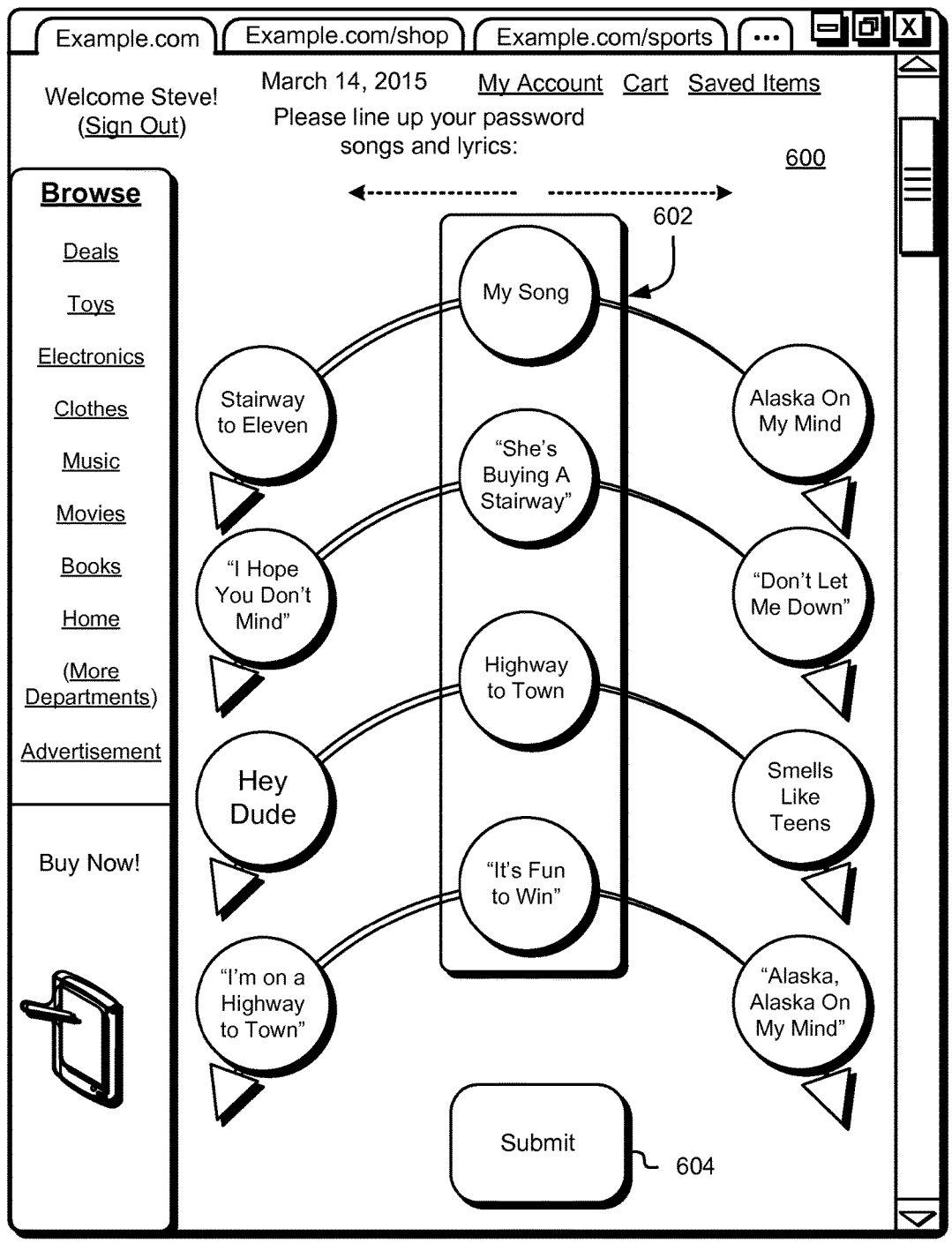
FIG. 6 shows a diagram illustrating a webpage for entering a password in accordance with various aspects of the present disclosure.

FIG. 6 shows a webpage 600 which may be displayed by an application executed by a computing device enabling a user to interact with a password management service operated by an online retailer or other organization. As illustrated in FIG. 6, the webpage 600 includes various graphical user interface elements that enable navigation throughout the electronic commerce website of which the webpage 600 is a part. The webpage 600 may be displayed by various applications, such as a mobile application or web browser. In this example, the webpage 600 includes various navigational features. For instance, the webpage 600 includes a password entry field 602 where the underlying code of the webpage 600 enables the user to enter a password, including passwords generated by the password management service. The password may comprise password elements selected from information provided by the user, such as the selection of songs and lyrics described above in connection with FIG. 5. The user may enter a password by matching or lining up password components with the password entry field 602.

In this example, the webpage 600 also includes a graphical user element configured as a "submit" button 604. The submit button 604 may be a graphical user interface element of the webpage 400 where the underlying code of the webpage 600 is configured such that selection by an input device of the submit button 604 causes information corresponding to the password entered by the user to be transmitted to the password management service or some other service, such as a password verification service. The received information corresponding to the password entered by the user may then be verified before access to one or more resources of the organization is allowed. Webpage 600 may also be configured such that audio corresponding to the songs comprising the user's password is played by a computing device displaying webpage 600 and the user may be asked to identify the audio played by the computing device.

Figure 7:
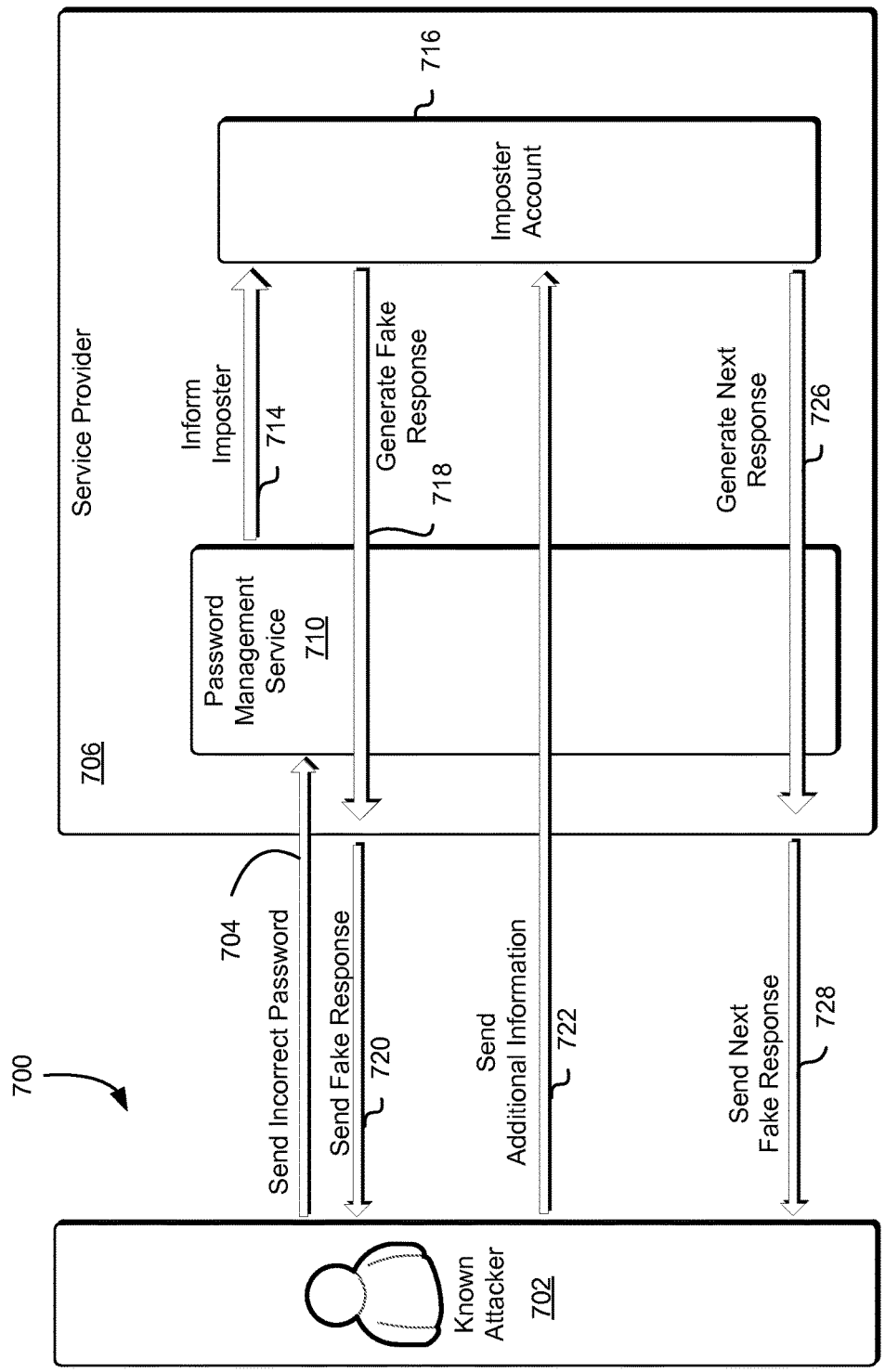
FIG. 7 illustrates an example environment where responses to incorrect passwords from known attackers may be generated in accordance with at least one embodiment.

FIG. 7 illustrates an example environment 700 where responses to password attacks from known attackers may be generated by an imposter in accordance with at least one embodiment. A known attacker 702 may attempt to log in in order to gain access to one or more resources of an organization, such as a service provider 706, using an invalid password 704 or other credential. For example, the known attacker 702 may attempt to access one or more resources of the service provider 706 using a password from the list of passwords generated by the password management service 710 as described above in connection with FIG. 1. The password may be a particular password from the list of passwords that was not selected by the user as the user's password. The known attacker may transmit incorrect password information to the service provider 706. The password information may be verified by the password management service 710 or other service of the service provider 706. The password management service 710 may detect an authentication submission, from the known attacker 702, purporting to be from the user containing an unselected password. Furthermore, the password management service 710 may be able to distinguish between the known attacker 702 attempting to access resources using an incorrect password included in the list of passwords associated with a particular user account from a password entered by a user that is identical to a password included in the list of passwords. The password management service 710 or other service may correlate the incorrect password with additional information corresponding to the user before informing the imposter account 716. For example, the password management service 710 may check an internet protocol address (IP address) associated with the incorrect password to determine if the IP address is recorded, by the service provider, as associated with the user. If the IP address is not recorded as associated with the user, the password management service 710 may inform the imposter 714.

In some embodiments, password management service 710 may inform 714 an imposter 716, which may then generate a fake response 718 and cause the fake response 720 to be sent to the known attacker 702. In some embodiments, the fake response 720 may include a number of different response types that may be configured to delay and/or foil the attack. The fake response 720 may, for example, include false account information included in a webpage designed to allow the known attacker 702 to interact with the service provider 706 as if the known attacker 702 had successfully been authenticated as the particular user the known attacker was attempting to impersonate. The fake response 720 may also include queries to the known attacker 702 so that the service provider 706 system may gather identifying information about the known attacker 702 including, but not limited to, information about the location of the attacker, the identity of the attacker, the ISP of the attacker and other such information. The fake response 720 may include a query to the known attacker 702 for further information which may then cause the known attacker 702 to send additional information 722 that may be received by the imposter 716, triggering the generation of a next response 726 that may be sent 728 to the known attacker 702. For example, the fake response 720 may include a query asking the user to update their location information in order to receive a free gift or other promotional item.

Figure 8:
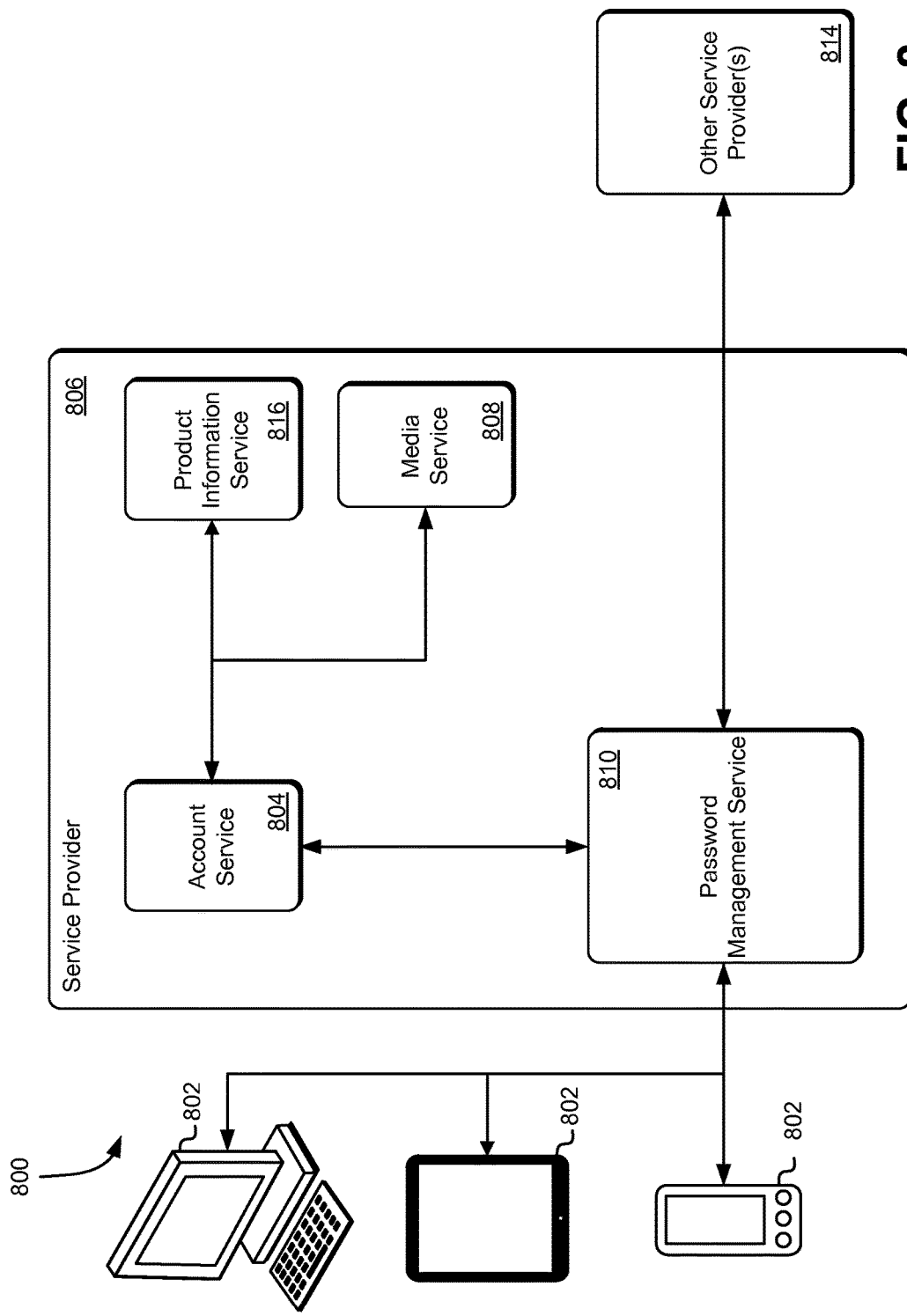
FIG. 8 shows an environment illustrating a password management service in accordance with various aspects of the present disclosure.

FIG. 8 shows an environment 800 in which users can connect to a service provider 806 in order to generate one or more passwords and populate passwords to one or more other services. Users can connect to the service provider 806 through one or more computing devices 802. The computing device 802 may include personal computers, smartphones, tablets or any other computing device capable of connecting to service provider 806. The computing device may transmit data over a network to a password management service 810 operated by the service provider 806. The password management service 810 may direct communications (also referred to as requests) from the computing devices 802 to the appropriate service of the service provider 806 once the credentials of the user operation computing device 802 have been verified. One or more other services of the service provider 806 may be responsible for authenticating users. The password management service 810 may then receive requests to generate new passwords from the computing devices 802 or the administrator service 812. Furthermore, users operating computing devices 802 may be directed to the password management service 810 for a variety of reasons including the user has reset their user password a number of times within a certain period, the users have their password compromised a certain number of times, an administrator setting, an updated security policy or any other reason suitable for requiring a user to establish a password.

The password management service 810 may be a collection of computing resources collectively configured to generate one or more passwords based at least in part on one or more sets of password components, where the one or more sets of password components may correspond to a seed value indicated by a user. For example, the password management service 810 may be a computer system connected over a network to the user and one or more other computer systems in order to receive password requests and information associated with the password requests. The seed value indicated by the user may be any seed discussed herein or any information useable for generating one or more passwords. The user may also indicate a plurality of seed values and rank or order the seed values based on user preference or other criteria. The password management service 810 may also communicate with one or more other services of the service provider 806 in order to obtain information corresponding to the seed value or otherwise obtain information useable for generating one or more passwords. For example, the password management service 810 may communicate with an account service 804, a product information service 816 or a media service 808.

The account service 804 may be a collection of computing resources collectively configured to maintain and manage information corresponding to user accounts, users, services and other information corresponding to users or the service provider 806. For example, the account service 804 may be a computer system responsible for maintaining user information such as user location, date of birth, name, address, contact information, credit card information or other information associated with users of the service provider 806. Information associated with the users may include performance reviews or other information about the actions of the users. The account service 804 may also receive requests from the password management service 810 for information corresponding to a particular user or one or more seed values indicated by a particular user. For example, the password management service 810 may request additional information from the account service 804 corresponding to a particular user's library.

The account service 804 may also request information from one or more additional services. For example, the account service 804 may request product data and/or product price from the product information service 816. The product information service 816 may collect information corresponding to goods or services offered for sale on an electronic marketplace operated by the service provider 806. The product information service 816 may also store information corresponding to particular goods or services particular users have viewed on the online marketplace. For example, the product information service 816 may store information corresponding to all the items a particular user has viewed using computing device 802. The password management service 810 may use the information received from the product information service 816 to generate the one or more passwords as described above in connection with FIG. 1. The product information service 816 may also maintain information corresponding to the category or classification of goods and services offered for sale on the online market place.

The account service 804 may also request information from the media service 808 for use in generating one or more passwords by the password management service 810. The media service 808 may be a collection of computing resources collectively configured to retrieve one or more media files for use with the password management service including books, audio or video. The media service 808 may also contain one or more storage systems for storing media files. The media service 808 may also provide the account service 804 or the password management service 810 with information corresponding to the electronic book, audio or video file such as director, composer, genre, duration, performance, performer or any other information corresponding to the audio or video clip. The password management service 810 may generate the one or more passwords based on the information received from the media service 808 as described above in connection with FIG. 4. Once the one or more passwords are generated the password management service 810 may transmit one or more passwords in a list of passwords or other collection of passwords to the computing device 802 associated with the password request or a second device registered with the user account associated with the password request.

Figure 9:
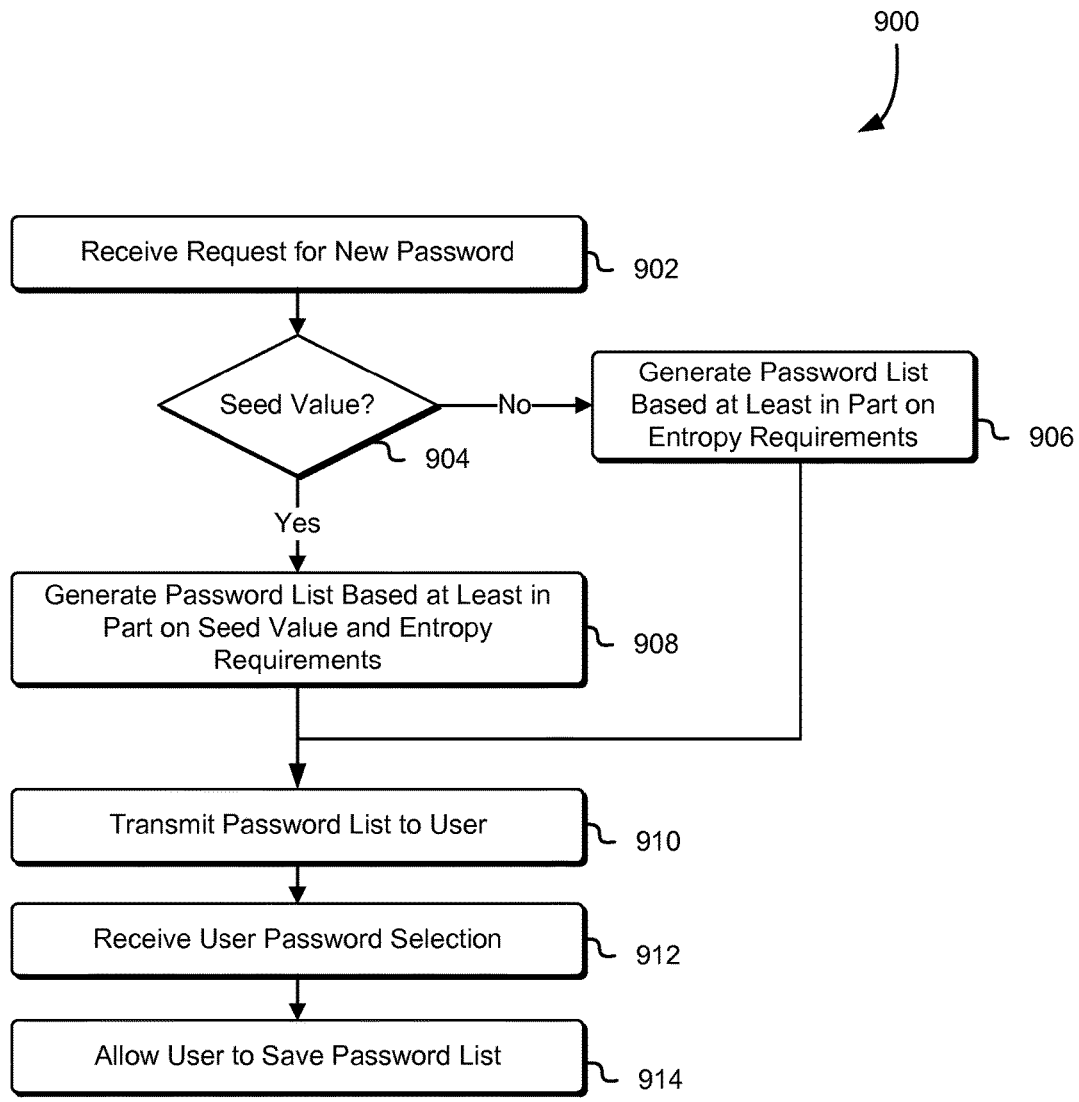
FIG. 9 shows an illustrative example of a process for generating a password list in accordance with at least one embodiment.

The password management service 810 may obtain and request information from the product information service 816 or the media service 808 directly or indirectly. Furthermore, the password management service 810 may receive from the computing device 802 an indication of a password selected by the user. The password management service 810 is configured to only generate one password for the user, the password management service 810 may transmit an indication to the computing device 802 of the password generated for the user. Additionally, the password management service 810 may transmit or receive information from one or more other service providers 814. For example, the password management service 810 may transmit the user-selected password to the one or more other service providers 814 in order to enable the user to use the selected password in connection with the one or more other service providers 814. Furthermore, the one or more other service providers 814 may transmit password requests directly to the password management service FIG. 9 shows an illustrative example of process 900 which may be used to generate a list of passwords and enable a user receiving the list of passwords to select a password from the list to use as a user password and save the list of passwords to help the user remember the selected user password. The process 900 may be performed by any suitable system such as the password management service 810 described above in connection to FIG. 8. Returning to FIG. 9, in an embodiment, the process 900 includes receiving a request for a new password 902. The request for a new password may be any request for a new password such as the request described above in connection with FIG. 1. The request may include additional information such as a seed value, user information, security system information, information corresponding to one or more other services or any other information suitable for generating and managing passwords. The request may be from a user requesting to change their password or may be sent on behalf of the user. Furthermore, the request may include a particular number of passwords to be generated for one or more users.

Once the password request has been received the password management service may generate a password. If no seed value 904 is present in the request, the password management service may generate the one or more passwords based at least on part on entropy requirements 906. The entropy requirements may be set by a system administrator or other entity of an organization. The password management service may also include default entropy requirements. Furthermore, the entropy requirements may change or otherwise alter depending on various factors such as the particular use of the password, the access level of the user or the number of passwords to be generated. For example, the entropy requirements for a user may be different than the entropy requirements for a password to be used with a wireless access point. If a seed value 904 is present in the requests, the password management service generates the list of passwords based at least in part on the seed value and the entropy requirements 908. The password management service may use the seed value to determine the set of password components as described above in connection with FIG. 1. For example, if the seed value contains the user's favorite author, the password management service may generate the set of password components based at least in part on famous quotes by the author or famous books by the author. The password management service may then select words from the generated set of password components in order to generate the list of passwords. Furthermore, the password management service may insert other characters and words between the password components in order to achieve the requested or otherwise indicated entropy requirements.

Once the password management service has generated the list of passwords, the password management service or other computer system may transmit the password list to the user 910. For example, the list of passwords may be sent to the user in an electronic mail message or sent to the user as a webpage. The user may then select a password from the list and the selection of the user password may be received 912 at the password management service. If the user does not select a password from the list of passwords, the password management service may generate a new list of passwords and transmit the new list of passwords to the user. The new list of passwords may include all new passwords or may include only a partial list of new passwords. Once the user has selected a password, the password management service may enable the user to save the list of passwords 914 including the password selected by the user. The password list may be saved as described above in connection with FIG. 2. For example, the user may be allowed to print a physical copy of the list of passwords or may receive an electronic copy of the list of passwords that may be saved to a computing device selected by the user.

Figure 10:
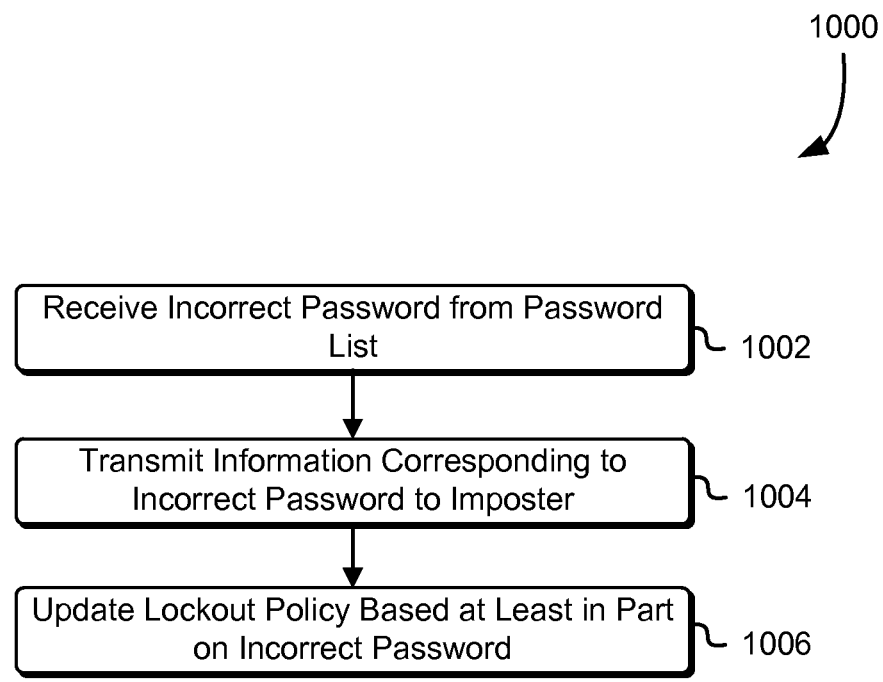
FIG. 10 shows an illustrative example of a process for adjusting lockout behavior in accordance with at least one embodiment.

FIG. 10 shows an illustrative example of process 1000 which may be used to adjust security behavior based at least in part on the list of passwords generated for a particular user. The process 1000 may be performed by any suitable system such as the imposter 716 described above in connection to FIG. 7. Returning to FIG. 10, in an embodiment, the process 1000 includes receiving an incorrect password from the list of passwords 1002. For example, the user may have printed up the list of passwords and an attack may have obtained the list of passwords and attempted to access one or more resources of the organization using a password from the list of passwords not selected by the user as the user's password. Information corresponding to the attack may be transmitted to an imposter 1004. The imposter may be a service as described above in connection with FIG. 7 configured to foil or delay an attack.

The imposter or other service may receive the information corresponding to the attack and may update lockout policy based at least in part on the received information 1006. The imposter may obtain additional information before updating the lockout policy. For example, if the imposter receives a particular incorrect password from the list of passwords for the first time, the imposter service may wait to determine if additional incorrect passwords from the list may be used in an attempt to access one or more resources of the organization. Similarly the imposter or other service may change lockout behavior over time. For example, if the user's password has been entered correctly a certain number of times without error the lockout behavior may be changed such that any incorrect password from the list of passwords automatically locks the user account and redirects the attacker to the imposter. The imposter may be configured to query the attack in order to gain additional information from the attacker as described above in connection with FIG. 7. For example, the imposter may allow the attack to update payment information or delivery address.

Figure 11:
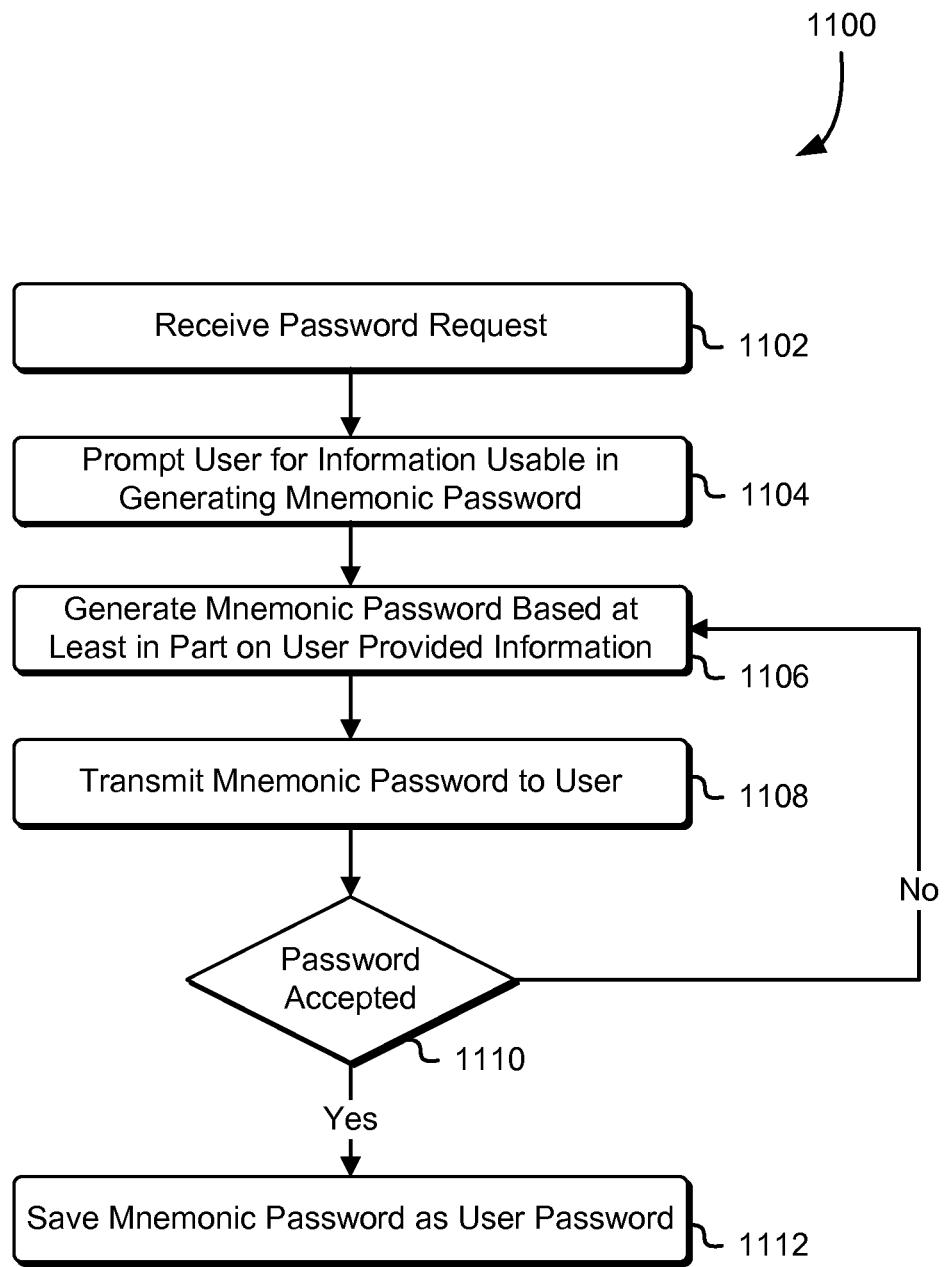
FIG. 11 shows an illustrative example of a process for generating a mnemonic in accordance with at least one embodiment.

FIG. 11 shows an illustrative example of process 1100 which may be used to generate one or more mnemonic based passwords. The process 1100 may be performed by any suitable system such as the password management service

810 described above in connection to FIG. 8. Returning to FIG. 11, in an embodiment, the process 1100 includes receiving a request for a new password 1102. The request for a new password may be any request for a new password such as the request described above in connection with FIG. 3. The user may then be prompted to provide information useable in generating mnemonic password 904. For example, the user may be asked to provide their favorite song lyric or select a quote from a book the user has purchased. The password management service may then generate a mnemonic password based at least in part on the information provided by the user 906. For example, the password management service may take the first letter of each word provided by the user and generate a password including at least the first letter of each word.

The password management service may also add additional entropy to the password by inserting one or more other characters into the password. The password management service may also perform one or more substitutions of characters. For example, the password management service may substitute "a" for "@" or "4." Furthermore, the substitutions may be limited and/or indicated by the user. For example, the password management service may only offer a substitution to a user if a certain number of a particular character is available for substitution. Returning to the example above, the password management service may only substitute "@" for "a" if there are at least five "a's" that can be substituted. The password management service may then prompt the user to ask if the user would like substitutions in the generated password.

Once the password management service has generated the password, the password may be transmitted to the user 1108. The password may be transmitted to the user as described above in connection with FIG. 3. For example, the password may be transmitted to the user as a webpage including various user interface elements configured to allow the user to accept or reject the password. If the password is not accepted 1110, the password management service may generate a new password using the same or a different technique. For example, the password management service may generate a new mnemonic password based on the information already provided by the user, may generate a new mnemonic password based on new information provided by the user or may generate a password using one or more other password generation techniques. If the password is accepted by the user, the password management service may save the mnemonic password as the user's password 1112. Saving the user's password may include providing one or more other services with information corresponding to the user's password.

Figure 12:
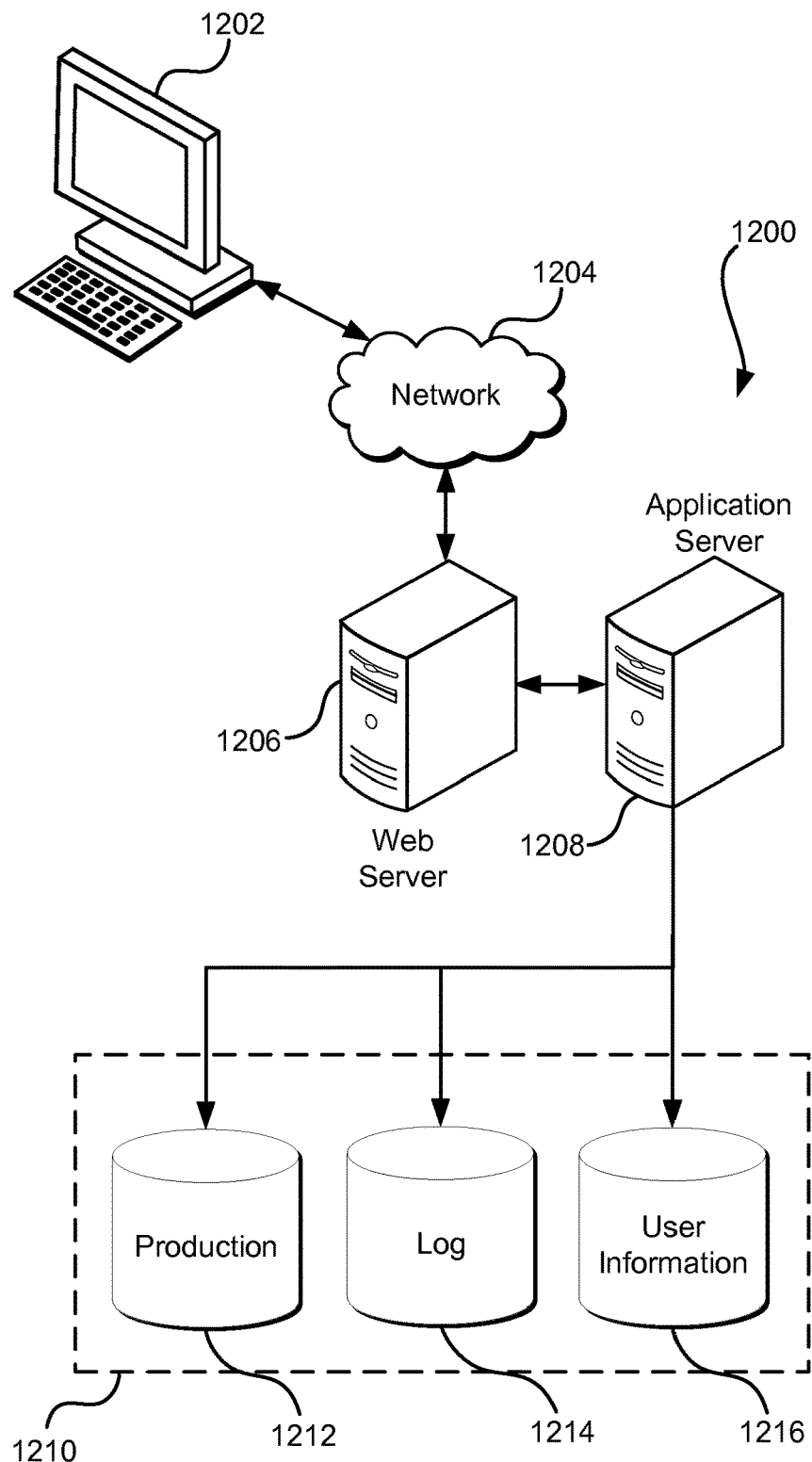
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
receiving a request for a new password, the new password associated with a user account, the request including text designated as a seed value;
submitting the seed value to one or more services other than an authentication service, the one or more services generating a set of words associated with the seed value;
receiving the set of words from the one or more services;
generating the plurality of passwords based at least in part on the set of words such that the plurality of passwords satisfy at least one entropy requirement;
transmitting the plurality of passwords to a user device associated with the user account;
receiving, from the user device, an indication of a selected password from the plurality of passwords;
setting the selected password as indicated by the user device as the new password associated with the user account;
detecting submission, in connection with the user account, of a password;
as a result of determining that the submission does not include the new password, determining whether the submission includes at least one password of the plurality of passwords that is different from the selected password; and
as a result of determining that the submission includes the at least one password of the plurality of passwords that is different from the new password, performing one or more actions to protect the user account.

2. The computer-implemented method of claim 1, wherein the request for the new password includes a seed value determined based at least in part on information associated with the user device.

3. The computer-implemented method of claim 2, wherein the computer-implemented method further includes:
prompting the user device for a book title to be used as the seed value; and
generating the plurality of passwords based at least in part on the seed value.

4. The computer-implemented method of claim 1, wherein the computer-implemented method further includes enabling the user device to store the plurality of passwords such that the plurality of passwords may be accessed during authentication of the user device.

5. A system, comprising at least one computing device configured to implement one or more services, wherein the one or more services are configured to:
receive a request for a new password, the new password associated with a user account, the request including text designated as a seed value;
submit the seed value to one or more services other than an authentication service, the one or more services generating one or more password components associated with the seed value;
receive the one or more password components from the one or more services;
generate the plurality of passwords based at least in part on the one or more password components such that the plurality of passwords satisfy at least one entropy requirement;
transmit the plurality of passwords to a user computing device associated with the user account;
receive, from the user computing device, authentication information comprising an indication of a selected password from the plurality of passwords;
set the selected password as indicated by the user device as the new password associated with the user account;
detect submission, in connection with the user account, of a password;
as a result of determining that the submission does not include the new password, determine whether the submission includes at least one password of the plurality of passwords that is different from the selected password; and
as a result of determining that the submission includes at least one password of the plurality of passwords that is different from the selected password, perform one or more actions in response to receiving the authentication information.

6. The system of claim 5, wherein the seed value includes an instance of media and the one or more password components include one or more attributes of the instance of media.

7. The system of claim 6, wherein the media instance includes at least one song title and the one or more attributes of the instance of media include at least one corresponding song lyric of the song title indicated by the user.

8. The system of claim 5, wherein the one or more services are further configured to
determine the seed value based on information based at least in part on one or more preferences indicated by the user.

9. The system of claim 5, wherein the one or more services are further configured to provide the selected password to one or more other services, where the one or more other services are configured to use the selected password as part of the authentication process.

10. The system of claim 5, wherein the one or more actions include locking out a user account associated with an attempt based at least in part on receiving the authentication information.

11. The system of claim 5, wherein the one or more services are further configured to store a subset of the plurality of passwords containing the selected password by causing the subset of the plurality of passwords containing the selected password to be printed out.

12. The system of claim 11, wherein storing the subset of the plurality of passwords containing the selected password includes transmitting the subset of the plurality of passwords containing the selected password to the user as an electronic message.

13. A non-transitory computer-readable storage medium having stored thereon executable instructions that, when executed by one or more processors of a computer system, cause the computer system to at least:
receive a request for a new passphrase, the new passphrase associated with a user account, the request including text designated as a seed value;
submit the seed value to another computer system, the other computer system retrieving one or more words associated with the seed value;
receive the one or more words from the other computer system;

generate the plurality of passphrases based at least in part on the one or more words such that the plurality of passphrases satisfy at least one entropy requirement;

transmit the plurality of passphrases to a user device associated with the user account;

receive, from the user device, an indication of a selected passphrase from the plurality of passphrases;

set the selected passphrase as indicated by the user device as the new passphrase associated with the user account;

detect submission, in connection with the user account, of a passphrase; and as a result of determining that the submission includes the new passphrase, allow access to one or more resources of an organization.

14. The non-transitory computer-readable storage medium of claim 13, wherein the other computer system is configured to retrieve one or more media files in response to receiving the seed value.

15. The non-transitory computer-readable storage medium of claim 13, wherein the instructions that cause the computer system to generate the plurality of passphrases further include instructions that cause the computer system to generate a plurality of mnemonic passphrases.

16. The non-transitory computer-readable storage medium of claim 13, wherein the information used to generate the plurality of passphrases include one or more song lyrics indicated by locations of one or more song titles, the one or more song titles and locations indicated in the seed value.

17. The non-transitory computer-readable storage medium of claim 13, wherein the one or more words comprise at least one word from a language other than English.

18. The non-transitory computer-readable storage medium of claim 13, wherein the instructions that cause the computer system to generate the plurality of passphrases further include instructions that cause the computer system to generate the plurality of passphrases by at least:

selecting at least two words from the one or more words; and adding at least one additional character between the at least two words to generate the plurality of passphrases.

19. The non-transitory computer-readable storage medium of claim 18, wherein the instructions that cause the computer system to select the at least two words from the one or more words further include instructions that cause the computer system to determine the set of passphrase components based at least in part on a seed value.

20. The non-transitory computer-readable storage medium of claim 19, wherein the instructions further comprise instructions that, when executed by the one or more processors, cause the computer system to determine a set of quotes usable as the one or more words, the set of quotes obtained from information included in the seed value.

21. The computer-implemented method of claim 1, wherein generating the plurality of passwords based at least in part on the request further includes:

providing a plurality of categories to the user device in response to receiving a request for a new password;

receiving at least one selected category of the plurality of categories from the user device; and generating the plurality of passwords based at least in part on a seed value, the seed value determined based at least in part on the at least one selected category.

22. The system of claim 6, wherein the instance of media is selected based on a number of times the instance of media was accessed by another user, and wherein the one or more services are further configured to identify a set of new instances of media usable to generate another seed value, the other seed value used by the other service to generate a second set of password components.

23. The computer-implemented method of claim 1, wherein generating the plurality of passwords based at least in part on the request such that the plurality of passwords satisfy the at least one entropy requirement further includes:

injecting at least one alphanumeric character into a first password of the plurality of passwords, the plurality of passwords randomly generated based at least in part on the request being used as a random seed value;

determining the first password with the at least one alphanumeric character exceeds a threshold entropy value; and as a result of the first password with the at least one alphanumeric character does not exceed the threshold entropy value, injecting one or more additional numerical characters into the first password of the plurality of password until the first password exceeds the threshold entropy value.

* * * * *